(12) United States Patent
Yeom et al.

(10) Patent No.: US 12,545,247 B2
(45) Date of Patent: Feb. 10, 2026

(54) SYSTEM AND METHOD FOR REDUCING DAMAGE FROM VEHICLE COLLISION

(71) Applicants: Hyundai Motor Company, Seoul (KR); Kia Corporation, Seoul (KR)

(72) Inventors: Myung Ki Yeom, Incheon (KR); In Su Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 122 days.

(21) Appl. No.: 18/535,329

(22) Filed: Dec. 11, 2023

(65) Prior Publication Data

US 2025/0074399 A1     Mar. 6, 2025

(30) Foreign Application Priority Data

Sep. 4, 2023    (KR) .................. 10-2023-0116705

(51) Int. Cl.
    *B60W 30/08*        (2012.01)
    *B60W 10/08*        (2006.01)
              (Continued)

(52) U.S. Cl.
    CPC ............ *B60W 30/09* (2013.01); *B60W 10/08* (2013.01); *B60W 10/184* (2013.01);
              (Continued)

(58) Field of Classification Search
    CPC .... B60W 30/09; B60W 10/08; B60W 10/184; B60W 30/0953; B60W 30/0956;
              (Continued)

(56) References Cited

U.S. PATENT DOCUMENTS 6,359,553 B1 * 3/2002 Kopischke ........ B60R 21/01512
                                         340/436
2014/0350790 A1 * 11/2014 Akesson ............ B62D 15/0265
                                           701/41
(Continued)

FOREIGN PATENT DOCUMENTS

DE       102008005310 A1 *   7/2009   ............ B60W 30/09
EP          3756962 A1 * 12/2020   ............ B60W 30/09
(Continued)

*Primary Examiner* — Daniel M. Robert
(74) *Attorney, Agent, or Firm* — Fox Rothschild LLP

(57) ABSTRACT

A system for reducing damage from a vehicle collision includes an autonomous driving controller configured to calculate a collision index indicating the possibility of collision between a host vehicle and another vehicle approaching the host vehicle and to obtain data necessary to rotate the host vehicle in a stopped state. When the collision index is equal to or greater than a threshold value, the autonomous driving controller calculates a rotation direction and a rotation angle of the host vehicle based on a robustness index indicating the degree of damage to the host vehicle depending on a heading angle of the other vehicle and a collision position of the host vehicle. The autonomous driving controller calculates the rotation direction and rotation angle of the host vehicle so that collision with the other vehicle occurs at a collision position at which a value of the robustness index is maximized.

20 Claims, 8 Drawing Sheets

(51) Int. Cl.
*B60W 10/184* (2012.01)
*B60W 30/09* (2012.01)
*B60W 30/095* (2012.01)
*B60W 60/00* (2020.01)

(52) U.S. Cl.
CPC .... *B60W 30/0953* (2013.01); *B60W 30/0956* (2013.01); *B60W 60/0015* (2020.02); *B60W 2554/4042* (2020.02); *B60W 2554/4044* (2020.02); *B60W 2554/802* (2020.02)

(58) Field of Classification Search
CPC ..... B60W 60/0015; B60W 2554/4042; B60W 2554/4044; B60W 2554/802; B60W 10/20; B60W 2030/082; B60W 30/08; B60W 10/18; B60W 40/02; B60W 50/0097; B60W 2420/403; B60W 2420/408; B60W 2554/80; B60Y 2300/08; B60Y 2306/01; B60Y 2400/3015; B60Y 2400/3017

See application file for complete search history.

(56) References Cited

U.S. PATENT DOCUMENTS

2017/0291602 A1* 10/2017 Newman ............... B60W 10/18
2019/0031189 A1* 1/2019 Patana .................. B60W 10/20
2025/0074399 A1* 3/2025 Yeom .................. B60W 10/184

FOREIGN PATENT DOCUMENTS

JP     2006062419 A  *  3/2006
KR    20180015017 A  *  2/2018  ............ B60W 40/02

* cited by examiner

SYSTEM AND METHOD FOR REDUCING DAMAGE FROM VEHICLE COLLISION

CROSS-REFERENCE TO RELATED APPLICATION

This application claims under 35 U.S.C. § 119 (a) the benefit of Korean Patent Application No. 10-2023-0116705 filed on Sep. 4, 2023, the entire contents of which are incorporated herein by reference.

BACKGROUND

(a) Technical Field

The present disclosure relates to a system and method for reducing damage in the event of a vehicle collision, more particularly, to the system and method which determine the possibility of collision in a host vehicle, such as a parked vehicle, and control the host vehicle so as to minimize damage thereto.

(b) Description of the Related Art

For convenience of users, vehicles are equipped with various sensors and electronic devices. In particular, autonomous driving systems are in development to enable a vehicle to recognize the surrounding environment and to automatically travel to a desired destination by itself without intervention by a driver according to the recognized surrounding environment.

A vehicle equipped with such an autonomous driving system is referred to as an autonomous vehicle. That is, the autonomous vehicle is capable of recognizing the surrounding environment and automatically traveling to a desired destination by itself without intervention by a driver according to the recognized surrounding environment.

A vehicle equipped with an autonomous driving system has a function of predicting and avoiding collision with a surrounding vehicle. However, when a vehicle is in a turned-off state after parking or stoppage, there is no way to avoid collision with another vehicle. Further, there is no clear reference to how a parked vehicle avoids collision with another vehicle. Furthermore, when a parked vehicle is not able to avoid collision with another vehicle, there is no clear reference to how to control the parked vehicle.

The above information disclosed in this Background section is only for enhancement of understanding of the background of the disclosure, and therefore it may contain information that does not form the related art that is already known in this country to a person of ordinary skill in the art.

SUMMARY

The present disclosure provides a system and method for reducing damage in a host vehicle (e.g., a parked vehicle) in the event of a collision, by controlling a host vehicle using a robustness index indicating the degree of damage to the host vehicle in order to minimize damage as the result of a collision with another vehicle.

In one aspect, the present disclosure provides a system for reducing damage caused by collision. The system includes an autonomous driving controller configured to calculate a collision index indicating the possibility of collision between a host vehicle and another vehicle approaching the host vehicle and to obtain data necessary to rotate the host vehicle in a stopped state. When the collision index is equal to or greater than a threshold value, the autonomous driving controller calculates a rotation direction and a rotation angle of the host vehicle based on a robustness index indicating the degree of damage to the host vehicle depending on a heading angle of the other vehicle and a collision position of the host vehicle. The autonomous driving controller calculates the rotation direction and the rotation angle of the host vehicle so that collision with the other vehicle occurs at a collision position at which a value of the robustness index is maximized.

In a preferred embodiment, the autonomous driving controller may continuously calculate the collision index while the other vehicle approaches the host vehicle. When the collision index is equal to or greater than a first threshold value, the autonomous driving controller may supply power to components configured to rotate the host vehicle. When the collision index is equal to or greater than the threshold value, the autonomous driving controller may calculate the rotation direction and the rotation angle of the host vehicle. The threshold value may be a second threshold value, and the second threshold value may be greater than the first threshold value.

In another preferred embodiment, the collision index may be calculated based on at least one of a speed of the other vehicle, a distance between the host vehicle and the other vehicle, or an expected collision area. The expected collision area may be an area in which a virtual shape indicating the host vehicle and a virtual shape indicating the other vehicle overlap each other based on a heading angle of the other vehicle with respect to a reference direction in which the host vehicle is oriented and based on the position of the center of the host vehicle.

In still another preferred embodiment, the collision index equal to or greater than the threshold value may mean a state in which it is impossible to avoid collision with the other vehicle in spite of control of the host vehicle.

In yet another preferred embodiment, the robustness index may be calculated based on a repair cost of the host vehicle varying depending on a collision position between the host vehicle and the other vehicle. The robustness index may be determined based on a value obtained by dividing an expected repair cost at a specific collision position by a maximum repair cost selected from among expected repair costs at a plurality of collision positions.

In still yet another preferred embodiment, the robustness index may vary depending on a speed of the other vehicle approaching the host vehicle.

In a further preferred embodiment, the collision position of the host vehicle may be determined based on the relationship between the center of the host vehicle and the heading angle of the other vehicle.

In another further preferred embodiment, the autonomous driving controller may determine the center of rotation of the host vehicle taking into consideration the center of the host vehicle, the heading angle of the other vehicle, the rotation direction, and the robustness index.

In still another further preferred embodiment, the autonomous driving controller may determine one wheel among the wheels of the host vehicle to be the center of rotation of the host vehicle in order to rotate the host vehicle in a direction away from the other vehicle, and the determined wheel may be a wheel required to be braked.

In yet another further preferred embodiment, the autonomous driving controller may select a wheel required to be braked and a wheel required to be driven from among the wheels taking into consideration the center of rotation, the rotation angle, and the rotation direction.

In still yet another further preferred embodiment, a wheel disposed on the same side as the determined wheel, among the left and right sides of the host vehicle based on a reference direction that is oriented from the rear to the front of the host vehicle, may be a wheel not required to be braked or driven, and wheels disposed on a side opposite the determined wheel, among the left and right sides of the host vehicle, may be wheels required to be driven.

In a still further preferred embodiment, when the center of rotation is the center of the host vehicle, all of the wheels may be wheels required to be driven.

In a yet still further preferred embodiment, the autonomous driving controller may calculate a steering direction of the host vehicle based on the rotation direction, the rotation angle, and the center of rotation, and the system may further include a steering controller configured to control a steering angle of the host vehicle based on information about the steering direction calculated by the autonomous driving controller.

In a yet still further preferred embodiment, the system may further include a motor controller configured to control driving of a motor mounted to the wheel required to be driven and a brake controller configured to perform braking of the wheel required to be braked based on the rotation direction, the rotation angle, and the center of rotation calculated by the autonomous driving controller.

In another aspect, the present disclosure provides a method of reducing damage caused by collision. The method includes detecting, by sensors, movement of another vehicle approaching a host vehicle, calculating, by a controller, a collision index indicating the possibility of collision between the host vehicle and the other vehicle, determining, by the controller, whether to supply power to components configured to rotate the host vehicle by determining whether the collision index is equal to or greater than a first threshold value, and calculating, by the controller, a rotation direction and a rotation angle of the host vehicle based on a robustness index indicating the degree of damage to the host vehicle depending on a heading angle of the other vehicle and a collision position of the host vehicle by determining whether the collision index is equal to or greater than a second threshold value.

In a preferred embodiment, the calculating a rotation direction and a rotation angle of the host vehicle may include determining the center of rotation of the host vehicle taking into consideration the center of the host vehicle, the heading angle of the other vehicle, the rotation direction, and the robustness index.

In another preferred embodiment, the controller may determine the robustness index varying based on a speed of the other vehicle approaching the host vehicle.

In still another preferred embodiment, the method may include controlling, by the controller, wheels of the host vehicle in order to rotate the host vehicle in the rotation direction and to the rotation angle about the determined center of rotation, and stoppage, driving, or braking of each of the wheels may be determined depending on the rotation direction and the center of rotation.

In yet another preferred embodiment, when the center of rotation is determined to be the center of the host vehicle, all of the wheels may be driven by the controller, and when the center of rotation is determined to be one wheel among the wheels, a wheel disposed on the same side as the determined wheel, among the left and right sides of the host vehicle, may be kept stationary by the controller, and wheels disposed on a side opposite the determined wheel, among the left and right sides of the host vehicle, may be driven by the controller.

In still yet another preferred embodiment, the controller may stop the driven wheels in advance before the host vehicle reaches a position corresponding to calculated target angle taking into consideration occurrence of additional rotation of the host vehicle due to inertia when the driven wheels are braked.

In another preferred embodiment, a vehicle includes the system for reducing damage from a vehicle collision.

In additional aspects, vehicles are provided that comprises a seat and seat assembly as disclosed herein.

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

Other aspects and preferred embodiments of the disclosure are discussed infra. disclosure

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
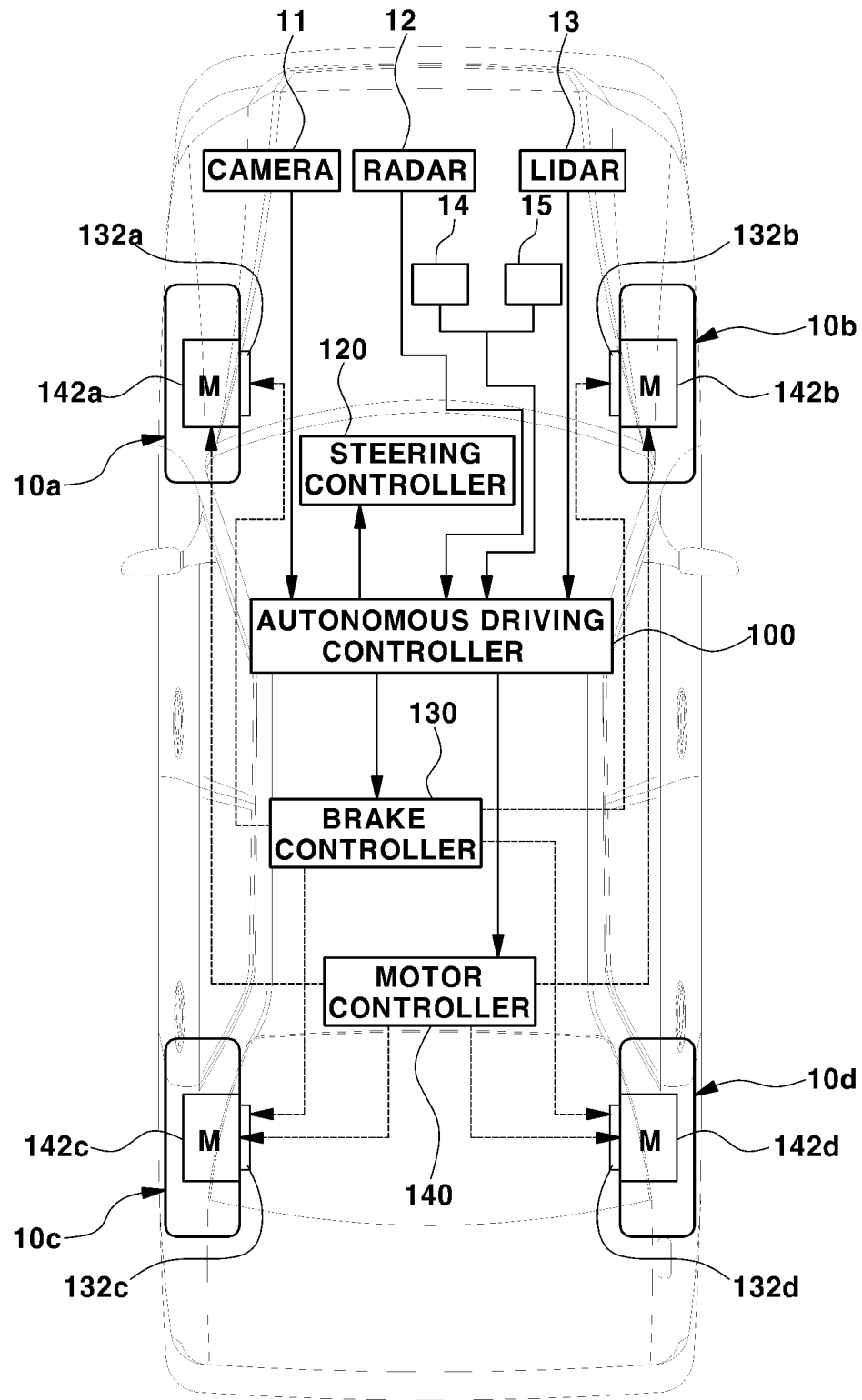
FIG. 1 is a diagram showing a system for reducing damage caused by collision according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Advantages and features of the present disclosure and methods for achieving the same will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Throughout the specification, the same reference numerals represent the same components.

Further, in the following description, the terms "first" and "second" are used only to avoid confusing designated components, and do not indicate the sequence or importance of the components or the relationships between the components.

The detailed description is illustrative of the present disclosure. Also, the following description is intended to illustrate and explain the exemplary embodiments of the present disclosure, and the present disclosure may be used in various other combinations, modifications, and environments. In other words, the present disclosure may be changed or modified within the scope of the concept of the disclosure disclosed herein, the scope equivalent to the disclosure, and/or the scope of technology or knowledge in the art. The described embodiments illustrate the best state for implementing the technical spirit of the present disclosure, and various changes may be made thereto as being demanded for specific applications and uses of the present disclosure. Accordingly, the following detailed description is not intended to limit the present disclosure to the embodiments disclosed herein. Also, the appended claims should be construed as encompassing such other embodiments.

FIG. 1 is a diagram showing a system for reducing damage in the event of a vehicle collision according to an embodiment of the present disclosure.

Referring to FIG. 1, a vehicle may be equipped with a controller for control of autonomous driving. The controller may include an autonomous driving controller 100, which determines and calculates data necessary to control autonomous driving, generates a travel path of the vehicle in real time through calculation based on information about the travel path and the surrounding environment detected by a sensor, and executes a command without intervention by a driver, and may further include a steering controller 120, a brake controller 130, and a motor controller 140, which directly control the vehicle based on the data calculated or determined by the autonomous driving controller 100. Each of the autonomous driving controller 100, the steering controller 120, the brake controller 130, and the motor controller 140 may be an electronic control unit (ECU). However, one electronic control unit may perform all of the functions that the autonomous driving controller 100, the steering controller 120, the brake controller 130, and the motor controller 140 perform. Each of the autonomous driving controller 100, the steering controller 120, the brake controller 130, and the motor controller 140 may perform cooperative control.

The autonomous driving controller 100 is configured to receive various data necessary for autonomous driving from autonomous driving sensors mounted in the vehicle, such as a camera 11, a radio detection and ranging (RADAR) device 12, a light imaging detection and ranging (LIDAR) device 13, a yaw rate sensor 14, and an accelerator sensor 15, and to perform overall autonomous driving control, such as control of a travel direction, acceleration, and deceleration of the vehicle, based on the received data.

The autonomous driving controller 100 may perform rotation control of the host vehicle in a parked state based on the received data in preparation for collision with another vehicle approaching the host vehicle. In a parked state, the driver may activate the system for reducing damage caused by collision in order to minimize damage to the host vehicle caused by collision. For example, the driver may activate the system for reducing damage caused by collision in a parked state through selection of a menu displayed on an AVN display, through a voice input device, through a dedicated application of a smart device, or through an operation switch located in the vehicle. Other than activation of the system by operation by the driver, the system may be activated when the vehicle is in a parked or stopped state and a determination as to whether another vehicle or an object is present near the host vehicle is made. For example, when there is another vehicle parked near the host vehicle, the system may not be activated due to the possibility of the other vehicle being damaged by rotation control of the host vehicle. However, the conditions under which the system is activated may not be particularly limited and may be determined in advance by a designer.

In an activated state of the system, power for operation may be applied to the autonomous driving sensors, such as the camera 11, the RADAR 12, and the LIDAR 13, and the autonomous driving controller 100. The autonomous driving sensors, such as the camera 11, the RADAR 12, and the LIDAR 13, may monitor movement of another vehicle approaching the host vehicle. The autonomous driving controller 100 may calculate a distance between the host vehicle and the other vehicle, a speed of the other vehicle, and a heading angle at which the other vehicle approaches the host vehicle based on data received from the autonomous driving sensors, such as the camera 11, the RADAR 12, and the LIDAR 13.

The yaw rate sensor 14 and the acceleration sensor 15 may measure data, based on which the autonomous driving controller 100 determines a change in the position of the host vehicle in a rotating state. The autonomous driving controller 100 may receive a yaw rate signal from the yaw rate sensor 14, may receive longitudinal-direction acceleration and lateral-direction acceleration signals from the acceleration sensor 15, and may determine a change in the movement position of the host vehicle that is rotated in preparation for collision with another vehicle.

The autonomous driving controller 100 may calculate a collision index indicating the possibility of collision between the host vehicle and another vehicle approaching the host vehicle. The autonomous driving controller 100 may calculate a collision index based on at least one of a speed of the other vehicle, a distance between the host vehicle and the other vehicle, or an expected collision area. In detail, the product of the speed of the other vehicle, the distance between the host vehicle and the other vehicle, and the expected collision area may be the collision index. The expected collision area may be an area in which a virtual shape indicating the host vehicle and a virtual shape indicating the other vehicle overlap each other based on a heading angle of the other vehicle with respect to a reference direction in which the host vehicle is oriented and based on the position of the center of the host vehicle.

In an example, the center of the host vehicle may be determined in advance based on the length, width, and height of the body of the host vehicle and a distance from the foremost portion of the body of the host vehicle to the center of gravity thereof. That is, the center of the host vehicle may be the center of gravity thereof or a center calculated based on the length and width of the body of the host vehicle. The autonomous driving controller 100 may calculate a distance between the center of the host vehicle and the other vehicle and a heading angle of the other vehicle using the autonomous driving sensors mounted in the host vehicle, such as the camera 11, the RADAR 12, and the LIDAR 13. The autonomous driving controller 100 may calculate an expected collision area in which a virtual rectangular shape indicating the host vehicle based on the center of the host vehicle and a virtual rectangular shape indicating the other vehicle overlap each other taking into consideration a heading angle of the other vehicle. In this case, the expected collision area may be an area in which a virtual rectangular shape indicating the host vehicle and a virtual rectangular shape indicating the other vehicle overlap each other.

The autonomous driving controller 100 may continuously calculate the collision index indicating the possibility of collision between the host vehicle and the other vehicle. A large value of the collision index (e.g., collision index is maximized) indicates a high possibility of collision between the host vehicle and the other vehicle.

When the collision index is equal to or greater than a first threshold value, the autonomous driving controller 100 may perform control such that power is supplied to components that function to rotate the host vehicle. As such, since power is supplied to the components that function to rotate the host vehicle at an early stage, it is possible to prepare for sudden rotation control of the host vehicle. The components may include at least one of motors 142a, 142b, 142c, and 142d connected to wheels 10a, 10b, 10c, and 10d to supply driving force thereto, brake devices 132a, 132b, 132c, and 132d configured to control braking of the wheels 10a, 10b, 10c, and 10d, or a steering angle control device configured to control steering angles of the wheels 10a, 10b, 10c, and 10d. In addition, the components may include the brake controller 130 configured to control the brake devices 132a, 132b, 132c, and 132d and the motor controller 140 configured to control the motors 142a, 142b, 142c, and 142d.

When the collision index is equal to or greater than a second threshold value, the autonomous driving controller 100 may calculate data including a rotation direction and a rotation angle of the host vehicle based on a robustness index indicating the degree of damage to the host vehicle depending on a heading angle of the other vehicle and a collision position of the host vehicle. In this case, the collision index equal to or greater than the second threshold value may mean a state in which it is impossible to avoid collision with the other vehicle in spite of control of the host vehicle. In other words, the system for reducing damage caused by collision according to the embodiment of the present disclosure may be a system for minimizing damage to the host vehicle caused by collision in a situation in which it is difficult to avoid collision between the host vehicle and another vehicle in spite of control of the host vehicle. Preferably, the system for reducing damage caused by collision according to the embodiment of the present disclosure may be a system for minimizing damage to the host vehicle caused by collision in a situation in which there is no occupant in the host vehicle and it is difficult to avoid collision between the host vehicle and another vehicle. The second threshold value may be greater than the first threshold value. The collision position of the host vehicle may be determined based on the relationship between the center of the host vehicle and a heading angle of another vehicle. The autonomous driving controller 100 may calculate data necessary to control rotation of the host vehicle taking into consideration the robustness index indicating the degree of damage to the host vehicle depending on the collision position of the host vehicle determined based on the heading angle of another vehicle.

When the collision index is equal to or greater than a third threshold value and less than the second threshold value, the autonomous driving controller 100 may calculate data necessary to rotate the host vehicle in order to avoid collision between the host vehicle and another vehicle. The third threshold value may be greater than the first threshold value and less than the second threshold value. This case may be a case in which avoidance of collision with another vehicle is possible through rotation control of the host vehicle. That is, this case may be a case of performing control for avoidance of collision itself, rather than performing control for minimization of damage to the host vehicle. The first threshold value, the second threshold value, and the third threshold value may be fixed values obtained in advance through simulations or real vehicle experiments.

TABLE 1

| Collision Type | Robustness Index (Medium Speed) | Robustness Index (High Speed) |
| --- | --- | --- |
| Front-Surface Left Offset Collision | 0.25 | 0.4 |
| Front-Surface Center Collision | 0.375 | 0.5 |
| Front-Surface Right Offset Collision | 0.25 | 0.4 |
| Rear-Surface Left Offset Collision | 0.5 | 0.6 |
| Rear-Surface Center Collision | 0.625 | 0.7 |
| Rear-Surface Right Offset Collision | 0.5 | 0.6 |
| Left-Surface Front Collision | 0 | 0 |
| Left-Surface Center Collision | 0.125 | 0.15 |
| Left-Surface Rear Collision | 0.25 | 0.4 |
| Right-Surface Front Collision | 0.25 | 0.4 |
| Right-Surface Center Collision | 0.25 | 0.4 |
| Right-Surface Rear Collision | 0.5 | 0.6 |

The robustness indices listed in Table 1 may be illustrative of indices indicating the degree of damage to the host vehicle depending on a collision position of the host vehicle. The robustness index of a vehicle may be calculated using results of collision tests during the development stage of the vehicle. For example, the collision type of a vehicle may be classified, depending on a collision position, into a total of twelve types, such as front-surface left offset collision, front-surface center collision, front-surface right offset collision, rear-surface left offset collision, rear-surface center collision, rear-surface right offset collision, left-surface front collision, left-surface center collision, left-surface rear collision, right-surface front collision, right-surface center collision, and right-surface rear collision. The robustness index may be stored in the autonomous driving controller 100 or a separate processor. In an example, the robustness index may be a numerical value calculated based on a cost required to repair the damaged part of the vehicle due to collision. In this case, the robustness index may be calculated as follows.

Robustness Index = 1 − (Expected Repair Cost/Maximum Repair Cost)

The robustness index may be determined based on a value obtained by dividing an expected repair cost at a specific collision position by a maximum repair cost selected from among expected repair costs at a plurality of collision positions. It is experimentally verified that a repair cost due to left-surface front collision is the highest. Therefore, the robustness index corresponding to left-surface front collision may be zero.

For example, the robustness index when another vehicle collides with the left portion of the front surface of the host vehicle is 0.25, and the robustness index when another vehicle collides with the center portion of the front surface of the host vehicle is 0.375. Therefore, upon determining that another vehicle is approaching the left portion of the front surface of the host vehicle, the autonomous driving controller 100 may control rotation of the host vehicle such that the other vehicle collides with the center portion of the front surface of the host vehicle.

In addition, the robustness index determined based on the repair cost of the vehicle may vary depending on a speed of another vehicle approaching the host vehicle. The robustness index when the speed of the other vehicle is a medium speed and the robustness index when the speed of the other vehicle is a high speed may be separately stored. For example, when the speed of the other vehicle is a medium speed, the robustness index corresponding to front-surface left offset collision and the robustness index corresponding to front-surface right offset collision may be identical to each other. However, when the speed of the other vehicle is a high speed, the robustness index corresponding to front-surface left offset collision may be greater than the robustness index corresponding to front-surface right offset collision. Therefore, the autonomous driving controller 100 may determine, based on the speed of the other vehicle, the robustness index that is applied to calculation of data necessary to rotate the host vehicle.

The autonomous driving controller 100 may calculate the rotation direction and rotation angle of the host vehicle based on the center of the host vehicle, the heading angle of another vehicle, and the robustness index. The autonomous driving controller 100 may calculate the rotation direction and the rotation angle of the host vehicle so that collision with the other vehicle occurs at a collision position having a relatively large robustness index value (e.g., the index value is maximized). The host vehicle may be rotated up to 90 degrees in each of the leftward and rightward directions. Limiting the rotation angle of the host vehicle may be intended to ensure reliability of rotation control of the host vehicle. In other words, when the possibility of collision between the host vehicle and the other vehicle is high, it takes a lot of time to control the host vehicle such that the host vehicle is rotated 90 degrees or more. Therefore, the rotation angle of the host vehicle may be limited to less than 90 degrees so that rotation of the host vehicle to the calculated rotation angle is completed before collision. The autonomous driving controller 100 may determine a collision position of the host vehicle based on the center of the host vehicle and the heading angle of the other vehicle. The autonomous driving controller 100 may calculate the rotation direction of the host vehicle based on an expected collision position of the host vehicle and the robustness index corresponding thereto in order to control the host vehicle such that collision the host vehicle with the other vehicle occurs at a collision position capable of minimizing the degree of damage to the host vehicle. The autonomous driving controller 100 may use the heading angle of the other vehicle and the robustness index to calculate the rotation direction. The autonomous driving controller 100 may calculate the rotation angle of the host vehicle based on a reference direction that is oriented from the rear to the front of the host vehicle, the heading angle of the other vehicle, and the robustness index. For example, when a rear collision of the host vehicle is expected, it may be determined based on the robustness index that rear-surface center collision causes minimum damage to the host vehicle. Therefore, the autonomous driving controller 100 may calculate the heading angle of the other vehicle as the rotation angle in order to induce rear-surface center collision of the host vehicle. In this case, the heading angle of the other vehicle may be determined based on the reference angle of the host vehicle.

The autonomous driving controller 100 may determine the center of rotation of the host vehicle taking into consideration the center of the host vehicle, the heading angle of the other vehicle, the rotation direction, and the robustness index. The autonomous driving controller 100 may determine one of the four wheels 10a, 10b, 10c, and 10d of the host vehicle to be the center of rotation, or may determine the center of the host vehicle to be the center of rotation. The autonomous driving controller 100 may determine the center of rotation about which the host vehicle is rotated in a direction away from the other vehicle in order to minimize damage to the host vehicle. The collision position of the host vehicle may vary depending on the center of rotation.

In an example, the autonomous driving controller 100 may determine one of the four wheels 10a, 10b, 10c, and 10d of the host vehicle to be the center of rotation in order to rotate the host vehicle in a direction away from the other vehicle. In this case, the determined wheel may be a wheel required to be braked. The wheel required to be braked may be a wheel that is braked at the time of commencement of rotation control of the host vehicle. The autonomous driving controller 100 may select a wheel required to be braked and a wheel required to be driven from among the wheels 10a, 10b, 10c, and 10d taking into consideration the center of rotation, the rotation angle, and the rotation direction. A wheel disposed on the same side as the determined wheel, among the left and right sides of the host vehicle based on the reference direction that is oriented from the rear to the front of the host vehicle, may be a wheel that is not required to be braked or driven. In other words, a wheel disposed on the same side as the determined wheel, among the left and right sides of the host vehicle based on the reference direction that is oriented from the rear to the front of the host vehicle, may be kept stationary. Wheels disposed on the side opposite the determined wheel, among the left and right sides of the host vehicle, may be wheels required to be driven. The wheels required to be driven may be wheels that are driven at the time of commencement of rotation control of the host vehicle.

In another example, when the center of rotation is the center of the host vehicle, all of the wheels 10a, 10b, 10c, and 10d may be wheels required to be driven.

The autonomous driving controller 100 may determine whether to drive each of the wheels required to be driven in the forward direction or the backward direction. When the center of rotation is one of the wheels 10a, 10b, 10c, and 10d and rear collision of the host vehicle is expected, the autonomous driving controller 100 may perform control such that wheels required to be driven are driven in the forward direction. When the center of rotation is one of the wheels 10a, 10b, 10c, and 10d and frontal collision of the host vehicle is expected, the autonomous driving controller 100 may perform control such that wheels required to be driven are driven in the backward direction. When the center of rotation is the center of the host vehicle, the driving direction of the left wheels 10a and 10c and the driving direction of the right wheels 10b and 10d may be opposite each other, and may vary depending on the rotation direction.

The autonomous driving controller 100 may calculate driving torque applied to each of the wheels required to be driven. In an example, the autonomous driving controller 100 may determine a maximum value of driving torque applied to each of the wheels required to be driven. In another example, the autonomous driving controller 100 may calculate driving torque applied to each of the wheels required to be driven based on the rotation angle of the host vehicle.

The autonomous driving controller 100 may calculate braking torque applied to each of the wheels required to be braked. In an example, the autonomous driving controller 100 may determine a maximum value of braking torque applied to each of the wheels required to be braked. In another example, the autonomous driving controller 100 may calculate braking torque applied to each of the wheels required to be braked based on the rotation angle of the host vehicle.

The autonomous driving controller 100 may determine a steering direction. When the host vehicle is rotated by backward driving, the steering direction may be determined to be a direction opposite a target rotation direction of the host vehicle. When the host vehicle is rotated by forward driving, the steering direction may be determined to be the same direction as the target rotation direction of the host vehicle. In order to achieve quick rotation of the host vehicle, the autonomous driving controller 100 may determine a maximum value of a steering angle.

In order to control rotation of the host vehicle, the autonomous driving controller 100 may transmit a steering angle signal and a steering direction signal to the steering controller 120, may transmit information about the wheel required to be braked and a braking torque signal to the brake controller 130, and may transmit information about the wheel required to be driven and a driving torque signal to the motor controller 140.

The steering controller 120 may be basically configured to perform steering control in response to a steering intention according to autonomous driving logic of the autonomous driving controller 100 or a steering intention according to steering wheel operation by the driver. In addition, the steering controller 120 may perform steering control for avoidance of collision in response to a signal for rotation of the host vehicle in preparation for collision with the other vehicle.

The brake controller 130 may selectively apply braking torque to the brake devices 132a, 132b, 132c, and 132d mounted to the respective wheels according to a wheel required to be braked and in response to a braking torque signal. The brake controller 130 may be an integrated electric brake (IEB) controller that includes an electronic stability control (ESC) device for vehicle dynamic control.

The motor controller 140 may basically apply driving torque for travel to the motors 142a, 142b, 142c, and 142d mounted to the respective wheels 10a, 10b, 10c, and 10d of the host vehicle. The motor controller 140 may control forward or backward movement of the driving wheels based on information received from the autonomous driving controller 100.

The motors 142a, 142b, 142c, and 142d may be in-wheel motors (IWMs). Therefore, forward or backward movement of each of the wheels 10a, 10b, 10c, and 10d may be individually performed by a corresponding one of the motors 142a, 142b, 142c, and 142d, and the driving torque or the braking torque applied to each of the motors 142a, 142b, 142c, and 142d may be different from that applied to the other motors.

According to the embodiment of the present disclosure, the host vehicle in a turned-off state may determine the possibility of collision with another vehicle by itself based on the collision index, and may determine whether to perform rotation control thereof by itself, thereby minimizing damage thereto caused by collision with another vehicle when the host vehicle is in a parked state.

According to the embodiment of the present disclosure, the host vehicle is rotated based on the robustness index indicating the degree of damage thereto, thereby minimizing damage thereto caused by an unavoidable collision with another vehicle.

Figure 2:
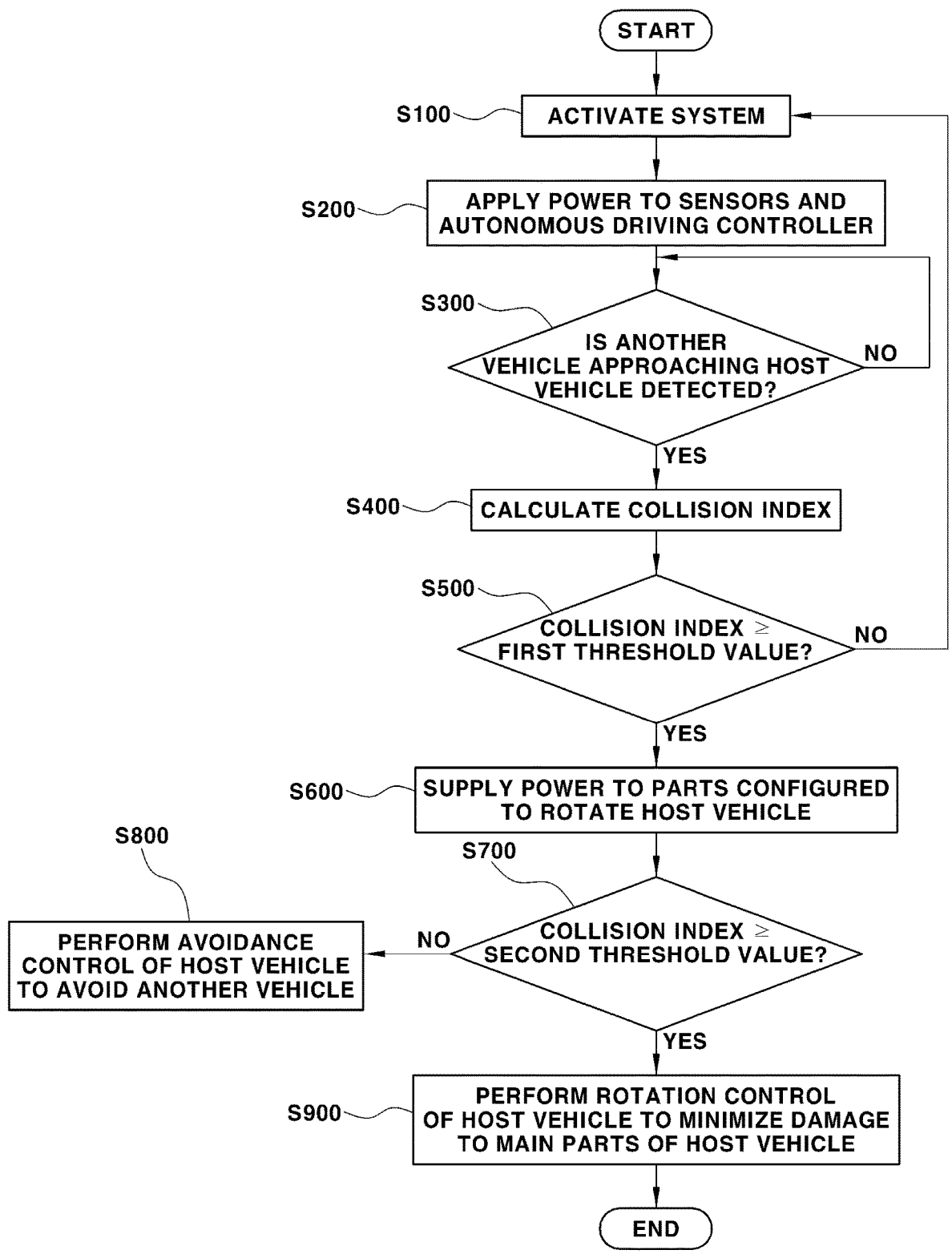
FIG. 2 is a flowchart showing a method of activating rotation control of a host vehicle by the system for reducing damage caused by collision according to an embodiment of the present disclosure.

FIG. 2 is a flowchart showing a method of activating rotation control of a host vehicle by the system for reducing damage caused by collision according to an embodiment of the present disclosure. For simplicity of description, a duplicate description of the same configurations as those described above will be omitted.

Referring to FIGS. 1 and 2, the system for reducing damage caused by collision may be activated by operation by the driver. In addition, in order to activate the system in a turned-off state of the host vehicle, it may be required to determine whether activation of the system is possible by determining whether the host vehicle is in a parked or stopped state or whether another vehicle or an object is present near the host vehicle (S100).

When the system is activated, power for operation may be applied to the autonomous driving sensors, such as the camera 11, the RADAR 12, and the LIDAR 13, and the autonomous driving controller 100 (S200).

The autonomous driving sensors may detect another vehicle approaching the host vehicle in real time. Upon determining that movement of another vehicle that is likely to approach the host vehicle has been detected, the autonomous driving controller 100 may control the autonomous driving sensors to monitor movement of the other vehicle in a high-speed sampling mode (at time intervals shorter than those in a reference sampling mode). For example, upon determining that movement of another vehicle that is likely to approach the host vehicle has been detected, the autonomous driving controller 100 may control the autonomous driving sensors to monitor movement of the other vehicle in a high-speed sampling mode (at time intervals shorter than those in the reference sampling mode) to acquire data on the movement of the other vehicle at very short time intervals. On the other hand, when movement of another vehicle is not detected or when movement of another vehicle is stopped and thus the movement thereof is not detected for a predetermined amount of time, the autonomous driving controller 100 may control the autonomous driving sensors to monitor information about another vehicle and an object present near the host vehicle in a low-speed sampling mode (at time intervals longer than those in the reference sampling mode) in order to prevent discharge of a battery due to operation of the autonomous driving sensors (S300).

The autonomous driving controller 100 may calculate a collision index based on the data acquired by the autonomous driving sensors. The collision index may be calculated as a product of a speed of the other vehicle approaching the host vehicle, a distance between the host vehicle and the other vehicle, and an expected collision area between the host vehicle and the other vehicle. The speed of the other vehicle and the distance between the host vehicle and the other vehicle may be values detected by the autonomous driving sensors. The expected collision area may be determined differently depending on specifications of the host vehicle, such as the length, width, and height of the body of the host vehicle and a distance from the foremost portion of the body of the host vehicle to the center of gravity (CG) thereof, a distance from the center of gravity of the host vehicle to the other vehicle, and a heading angle of the other vehicle (S400).

The autonomous driving controller 100 may determine whether the collision index is equal to or greater than a first threshold value. A case in which the collision index is less than the first threshold value may be a case in which the possibility of collision between the host vehicle and the other vehicle approaching the host vehicle is low and thus control of the host vehicle is not needed. When the collision index is less than the first threshold value, the autonomous driving controller 100 may determine whether the activated state of the system is maintained or released. Upon determining that the activated state of the system is maintained, the autonomous driving controller 100 may again perform the process of detecting the other vehicle approaching the host vehicle. Upon determining that the activated state of the system has been released, the autonomous driving controller 100 may not perform the process of detecting the other vehicle approaching the host vehicle (S500).

When the collision index is equal to or greater than the first threshold value, the autonomous driving controller 100 may perform control such that power is supplied to components that function to rotate the host vehicle. As such, since power is supplied to the components that function to rotate the host vehicle at an early stage, it is possible to prepare for sudden rotation control of the host vehicle (S600).

The autonomous driving controller 100 may determine whether the collision index is equal to or greater than a second threshold value. When the collision index is less than the second threshold value, the autonomous driving controller 100 may control the host vehicle in order to avoid the other vehicle, rather than controlling the host vehicle in preparation for collision with the other vehicle. In detail, the autonomous driving controller 100 may additionally determine whether the collision index is equal to or greater than a third threshold value, and may perform avoidance control of the host vehicle in order to avoid the other vehicle upon determining that the collision index is equal to or greater than the third threshold value and less than the second threshold value. The third threshold value may be a value that is less than the second threshold value and greater than the first threshold value (S700 and S800).

When the collision index is equal to or greater than the second threshold value, the autonomous driving controller 100 may perform rotation control of the host vehicle in order to minimize damage to main components of the host vehicle (S900).

Figure 3:
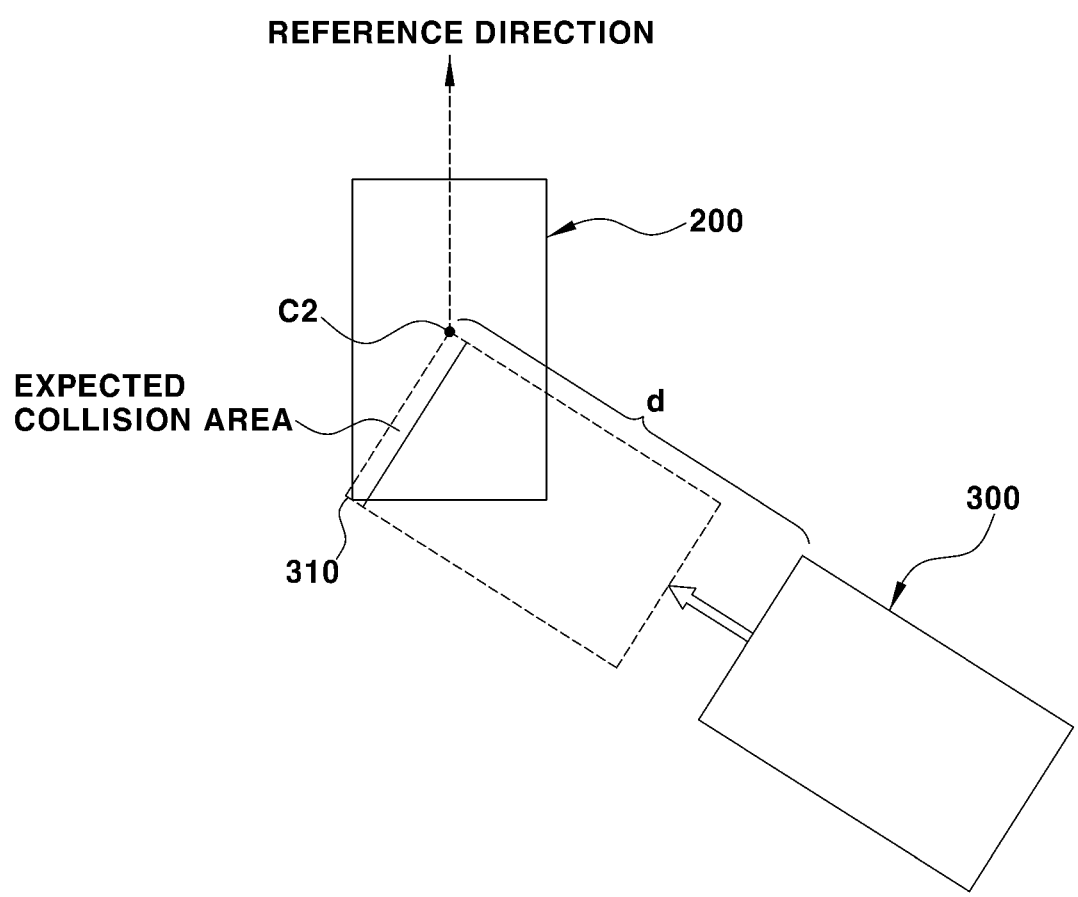
FIG. 3 is a diagram showing a method of calculating an expected collision area according to an embodiment of the present disclosure.

FIG. 3 is a diagram showing a method of calculating the expected collision area according to an embodiment of the present disclosure.

Referring to FIGS. 1 and 3, the autonomous driving controller 100 may calculate the expected collision area in order to obtain the collision index. In order to calculate the expected collision area, the autonomous driving controller 100 may determine the center C2 of the host vehicle, the heading angle of the other vehicle approaching the host vehicle, and the distance d between the center C2 of the host vehicle and the other vehicle. The expected collision area may be an area in which a virtual shape 300 indicating the other vehicle overlaps a virtual shape 200 indicating the host vehicle in a state of being moved at the heading angle by the distance d between the center C2 of the host vehicle and the other vehicle. In this case, the virtual shape 200 indicating the host vehicle may be obtained based on the center C2 of the host vehicle determined based on the length, width, and height of the body of the host vehicle and the distance from the foremost portion of the body of the host vehicle to the center of gravity thereof. In addition, the virtual shape 300 indicating the other vehicle may be obtained based on information about the external appearance of the other vehicle acquired through the camera 11, the RADAR 12, and the LIDAR 13 mounted in the host vehicle. However, the virtual shape 300 indicating the other vehicle may be a shape determined in advance, or may be set to have the same size as the virtual shape 200 indicating the host vehicle. For example, the virtual shape may be a rectangular shape, without being limited thereto.

In an example, the expected collision area may be an area in which the virtual shape 200 indicating the host vehicle and a front surface portion 310 of the virtual shape 300 indicating the other vehicle overlap each other in the state in which the virtual shape 300 indicating the other vehicle is moved at the heading angle by the distance d between the center C2 of the host vehicle and the other vehicle. The front surface portion 310 of the virtual shape 300 indicating the other vehicle may be an area determined in advance by a designer.

In another example, an area in which the virtual shape 200 indicating the host vehicle and the virtual shape 300 indicating the other vehicle overlap each other in the state in which the virtual shape 300 indicating the other vehicle is moved at the heading angle by the distance d between the center C2 of the host vehicle and the other vehicle may be obtained, and an area obtained by multiplying the longest side of the overlapping area by the predetermined height of the body of the host vehicle may be defined as the expected collision area.

Figure 4:
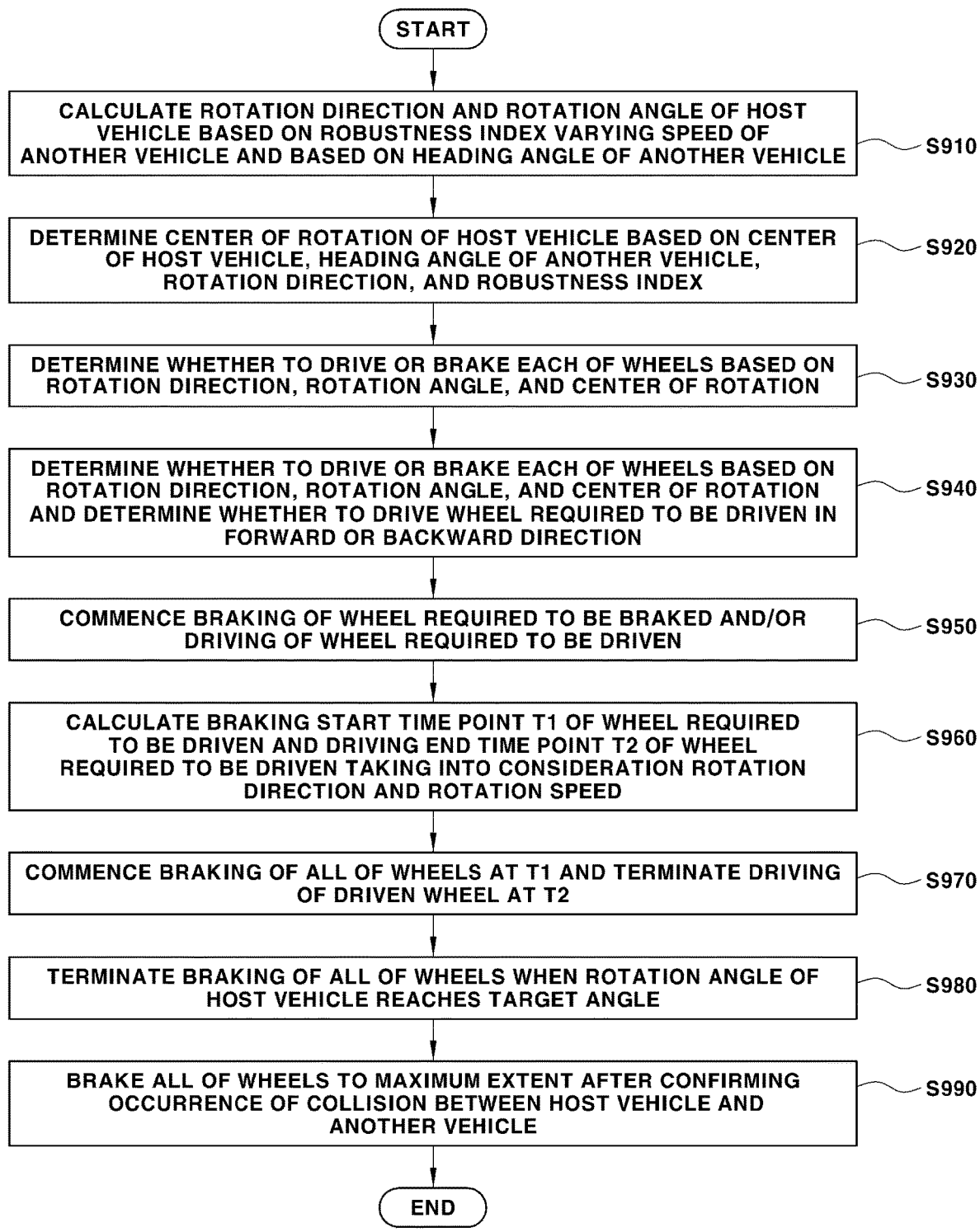
FIG. 4 is a flowchart showing a method of performing rotation control of the host vehicle according to an embodiment of the present disclosure.
Figure 5:
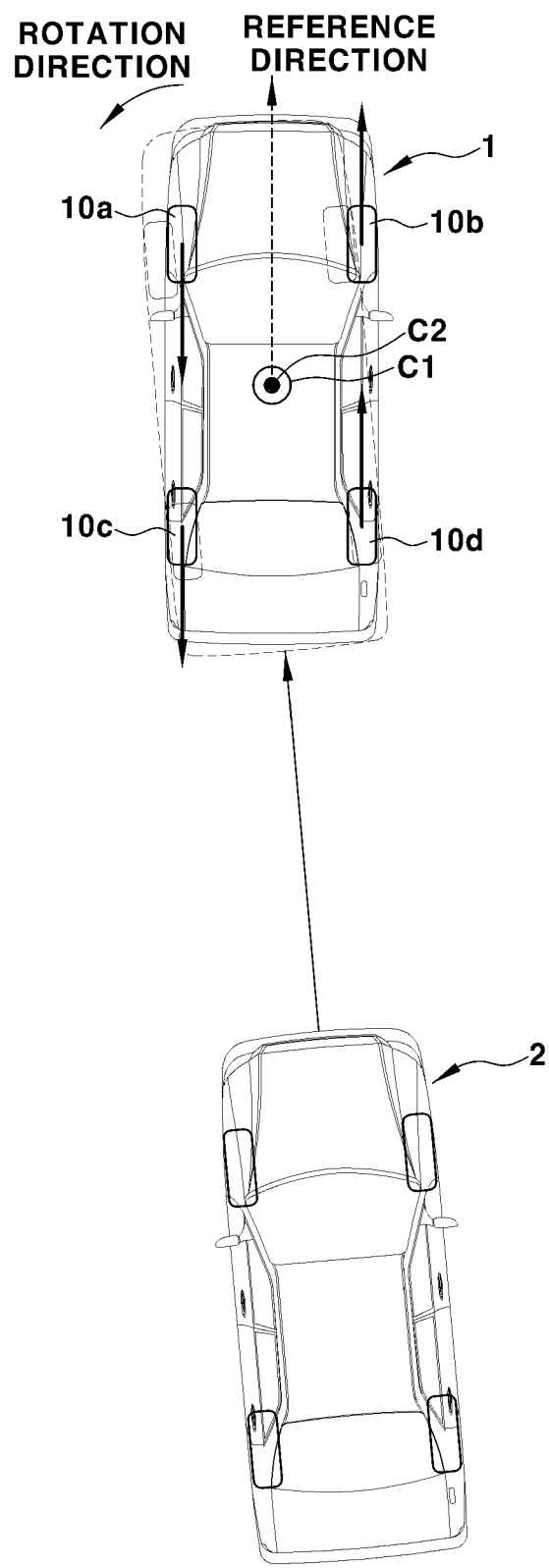
FIGS. 5 to 7 are diagrams showing examples of rotation control of the host vehicle according to an embodiment of the present disclosure.
Figure 6:
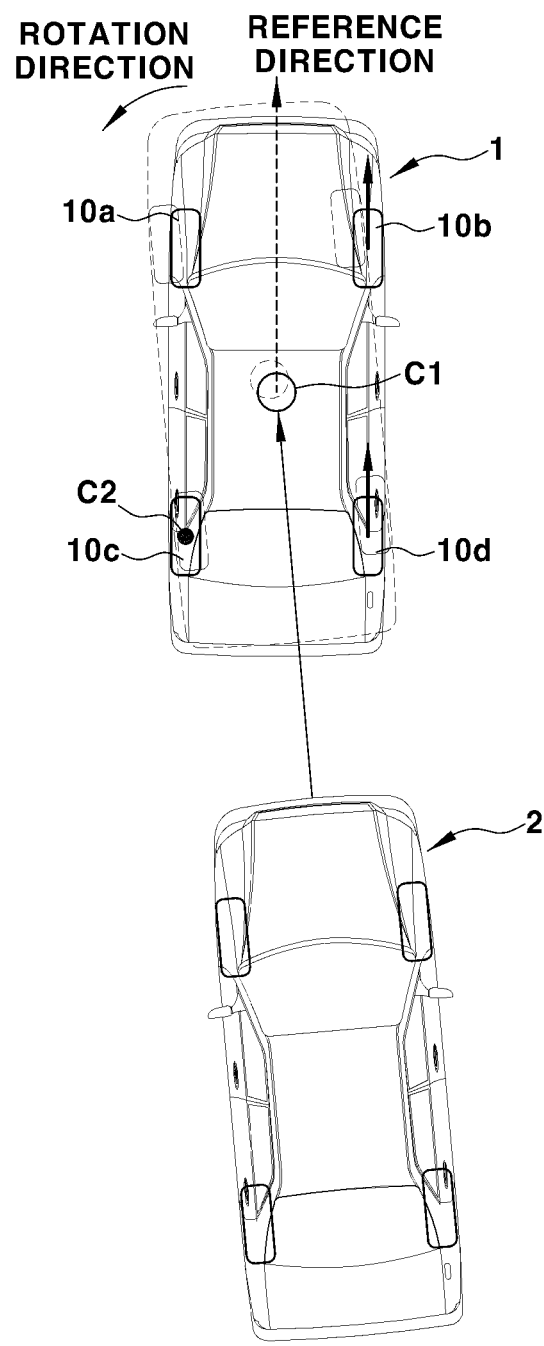
Figure 7:
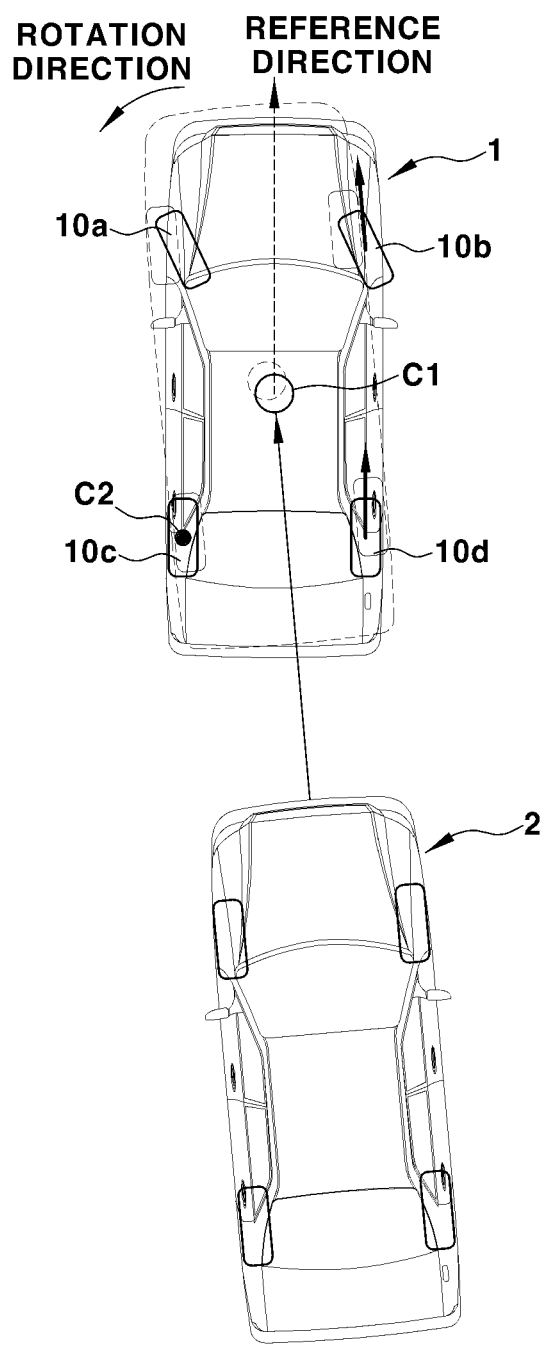
Figure 8:
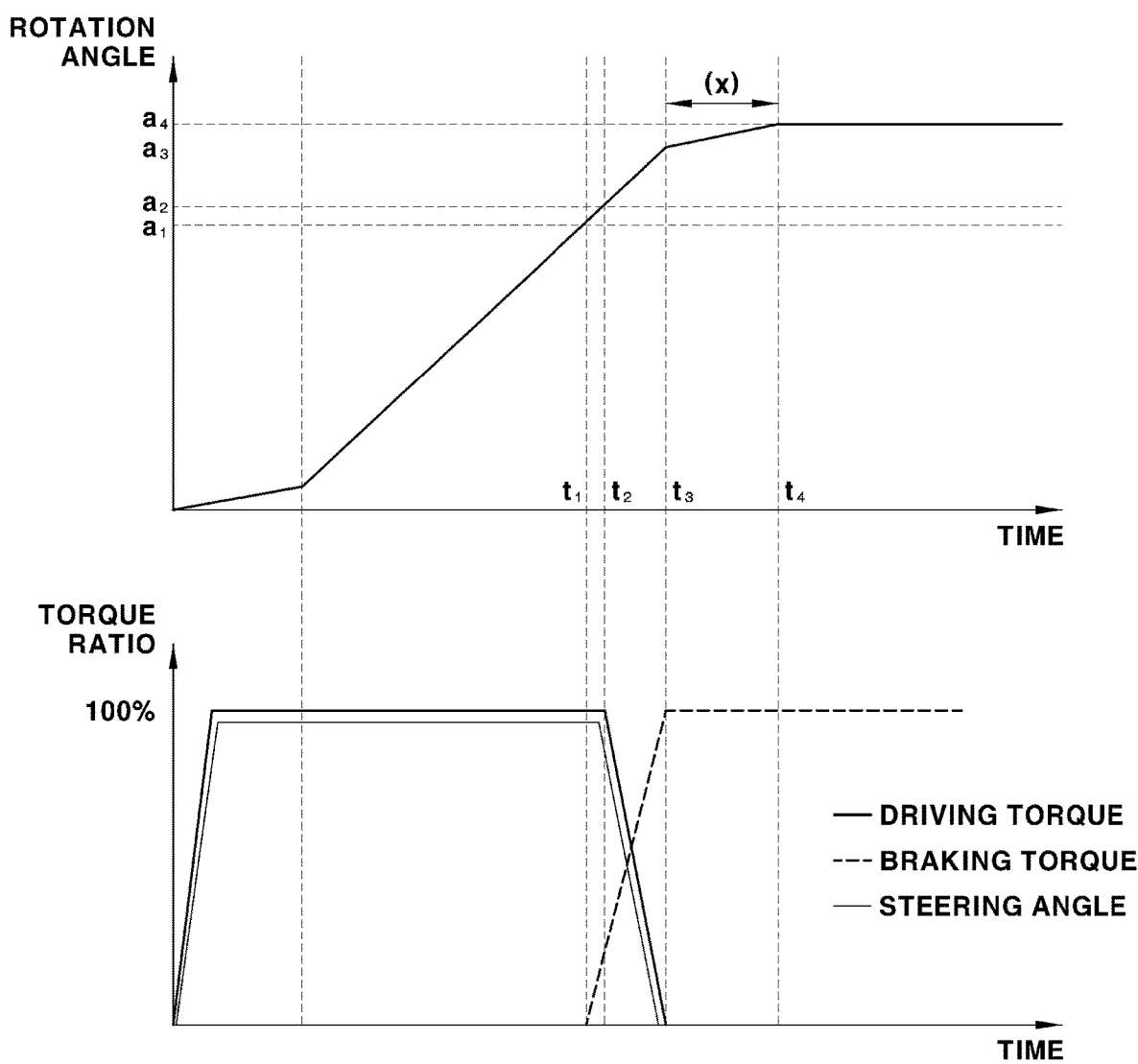
FIG. 8 is a diagram showing a time point at which driving torque or braking torque is applied to a wheel required to be driven among wheels of the host vehicle according to an embodiment of the present disclosure.

FIG. 4 is a flowchart showing a method of performing rotation control of the host vehicle according to an embodiment of the present disclosure. FIGS. 5 to 7 are diagrams showing examples of rotation control of the host vehicle according to an embodiment of the present disclosure. FIG. 8 is a diagram showing a time point at which driving torque or braking torque is applied to a wheel required to be driven among the wheels of the host vehicle according to an embodiment of the present disclosure. For simplicity of description, a duplicate description of the same configurations as those described above will be omitted.

Referring to FIGS. 1 and 4, the autonomous driving controller 100 may determine or calculate data necessary to perform rotation control of the host vehicle in order to minimize damage to main components of the host vehicle. The autonomous driving controller 100 may calculate the rotation direction and the rotation angle of the host vehicle based on a robustness index and a heading angle of another vehicle. The robustness index may indicate the degree of damage to the host vehicle depending on the heading angle of the other vehicle and the collision position of the host vehicle. Since the degree of damage to the host vehicle increases as the speed of the other vehicle increases, the robustness index may vary depending on the speed of the other vehicle. For example, the speed of the other vehicle may be divided into a medium speed and a high speed, and the robustness index corresponding to the medium speed and the robustness index corresponding to the high speed may be separately stored. The autonomous driving controller 100 may determine the robustness index based on the speed of the other vehicle (S910).

The center of rotation of the host vehicle may be determined based on the center of the host vehicle, the heading angle of the other vehicle, the rotation direction, and the robustness index. The autonomous driving controller 100 may predict the collision position of the host vehicle based on the relationship between the center of the host vehicle and the heading angle of the other vehicle, may calculate the rotation direction and the rotation angle based on the predicted collision position and the robustness index, and may determine the center of rotation based on the rotation direction and the robustness index. Since the collision position of the host vehicle may vary depending on the center of rotation, the autonomous driving controller 100 may determine the center of rotation so that the host vehicle is controlled such that collision occurs at an optimal collision position determined based on the robustness index and such that the host vehicle is rotated in a direction away from the other vehicle (S920).

The autonomous driving controller 100 may determine whether to drive or brake the wheels 10*a*, 10*b*, 10*c*, and 10*d* based on the rotation direction, the rotation angle, and the center of rotation (S930).

The autonomous driving controller 100 may determine whether to drive at least one wheel required to be driven among the wheels 10*a*, 10*b*, 10*c*, and 10*d* in the forward direction or the backward direction. In addition, the autonomous driving controller 100 may determine a steering direction. For example, when the host vehicle is rotated by backward driving, the steering direction may be determined to be a direction opposite a target rotation direction of the host vehicle, and when the host vehicle is rotated by forward driving, the steering direction may be determined to be the same direction as the target rotation direction of the host vehicle (S940).

The autonomous driving controller 100 may transmit data on the steering direction and the steering angle to the steering controller 120. The autonomous driving controller 100 may transmit data on the wheel required to be braked and data on the braking torque to the brake controller 130. The autonomous driving controller 100 may transmit data on the wheel required to be driven and data on the driving torque to the motor controller 140. Braking of the wheel required to be braked and/or driving of the wheel required to be driven may be commenced by the brake controller 130 and the motor controller 140. When the center of rotation is the center of the host vehicle, all of the wheels 10*a*, 10*b*, 10*c*, and 10*d* may be driven. When the center of rotation is one of the wheels 10*a*, 10*b*, 10*c*, and 10*d*, the wheel corresponding to the center of rotation may be braked, and the wheels disposed on the side opposite the braked wheel may be driven (S950).

Referring to FIGS. 1 and 5, another vehicle 2 is approaching the side portion of the rear surface of the host vehicle 1. Considering the robustness index in Table 1, the collision position of the host vehicle may be determined to be the center portion of the rear surface of the host vehicle because rear-surface center collision causes minimum damage to the host vehicle. The autonomous driving controller 100 may determine the rotation direction to be the counterclockwise direction taking into consideration the center C1 of the host vehicle and the heading angle of the other vehicle 2, and may also calculate the rotation angle taking into consideration the robustness index. The autonomous driving controller 100 may determine the center of rotation C2 to be the center C1 of the host vehicle 1 based on the center C1 of the host vehicle 1 and the heading angle of the other vehicle 2. The autonomous driving controller 100 may determine that the wheels 10*a* and 10*c* disposed on the left side based on the reference direction of the host vehicle 1 are required to be driven in the backward direction and the wheels 10*b* and 10*d* disposed on the right side based on the reference direction of the host vehicle 1 are required to be driven in the forward direction. The autonomous driving controller 100 may transmit information about the backward driving of the left wheels 10*a* and 10*c* and the forward driving of the right wheels 10*b* and 10*d* to the motor controller 140. In this case, the values of driving torque applied to the wheels 10*a*, 10*b*, 10*c*, and 10*d* may be determined to be the maximum values. The motor controller 140 may perform control such that the left wheels 10*a* and 10*c* are driven in the backward direction and the right wheels 10*b* and 10*d* are driven in the forward direction to rotate the host vehicle 1 in the counterclockwise direction. As a result, the other vehicle 2 may collide with the center portion of the rear surface of the host vehicle 1, which is the collision position at which minimum damage is caused to the host vehicle.

On the other hand, upon determining the rotation direction of the host vehicle 1 to be the clockwise direction, the autonomous driving controller 100 may determine that the wheels 10*a* and 10*c* disposed on the left side based on the reference direction of the host vehicle 1 are required to be driven in the forward direction and the wheels 10*b* and 10*d* disposed on the right side based on the reference direction of the host vehicle 1 are required to be driven in the backward direction.

Referring to FIGS. 1 and 6, another vehicle 2 is approaching the side portion of the rear surface of the host vehicle 1. Considering the robustness index in Table 1, the collision position of the host vehicle may be determined to be the center portion of the rear surface of the host vehicle because rear-surface center collision causes minimum damage to the host vehicle. The autonomous driving controller 100 may determine the rotation direction to be the counterclockwise direction taking into consideration the center C1 of the host vehicle and the heading angle of the other vehicle 2, and may also calculate the rotation angle taking into consideration the robustness index. The autonomous driving controller 100 may determine the center of rotation C2 to be the left-rear wheel 10*c* taking into consideration the center C1 of the host vehicle 1 and the heading angle of the other vehicle 2. If the right-front wheel 10*b* or the right-rear wheel 10*d* is selected as the center of rotation C2, the distance between the host vehicle 1 and the other vehicle 2 is reduced during rotation control. Therefore, in this embodiment, the right-front wheel 10*b* or the right-rear wheel 10*d* is not selected as the center of rotation C2. It can be seen that the other vehicle 2 collides with the center portion of the rear surface of the host vehicle 1 when the autonomous driving controller 100 determines the center of rotation C2 to be the left-rear wheel 10*c* among the left-front wheel 10*a* and the left-rear wheel 10*c*. The autonomous driving controller 100 may determine that the left-rear wheel 10*c* is required to be braked and the right-front wheel 10*b* and the right-rear wheel 10*d* are required to be driven. The autonomous driving controller 100 may transmit information about the forward driving of the right-front wheel 10*b* and the right-rear wheel 10*d* to the motor controller 140. In this case, the values of driving torque applied to the right-front wheel 10*b* and the right-rear wheel 10*d* may be determined to be the maximum values. The autonomous driving controller 100 may transmit information about the braking of the left-rear wheel 10*c* to the brake controller 130. In this case, the value of braking torque applied to the left-rear wheel 10*c* may be determined to be the maximum value. As the host vehicle 1 is rotated in the counterclockwise direction about the left-rear wheel 10*c*, the other vehicle 2 may collide with the center portion of the rear surface of the host vehicle 1, which is the collision position at which minimum damage is caused to the host vehicle.

Referring to FIGS. 1 and 7, steering control of the host vehicle 1 may be performed in order to rotate the host vehicle 1 more quickly. The autonomous driving controller 100 may transmit, to the steering controller 120, a command to control the steering angle to a maximum extent in the same direction as the rotation direction of the host vehicle 1. When the steering angle of the front wheels is used in order to quickly rotate the host vehicle 1, the length of a moment arm may be increased, and thus greater rotation torque may be obtained. When the front wheels are subjected to full-turn steering, i.e., when the steering angle of the front wheels is maximized in the same direction as the target rotation direction, greater rotation torque may be generated in the rotation direction of the host vehicle 1, and thus the host vehicle 1 may be rotated more quickly than when the steering angle of the front wheels is 0 degrees (FIG. 5). When backward driving in the target rotation direction of the host vehicle 1 is needed, the steering direction of the front wheels may be determined to be opposite the target rotation direction, and when forward driving in the target rotation direction of the host vehicle 1 is needed, the steering direction of the front wheels may be determined to be identical to the target rotation direction.

Referring to FIGS. 1, 4, and 8, the autonomous driving controller 100 may calculate a time point at which to stop driving of the wheels before the host vehicle reaches a position corresponding to the calculated target angle. The reason for this is that the host vehicle is additionally rotated due to inertia when the wheels that are driven are braked.

The autonomous driving controller 100 may calculate a braking start time point t1 of the wheel required to be driven and a driving end time point t2 of the wheel required to be driven taking into consideration the rotation direction and the rotation speed. In FIG. 8, the rotation angle may be a rotation angle of the host vehicle. A reference angle "a1" may be a rotation angle of the host vehicle at a braking start time point of the driven wheel. A reference angle "a2" may be a rotation angle of the host vehicle at a driving end time point of the driven wheel. A reference angle "a3" may be a rotation angle of the host vehicle at a time point at which braking torque of the driven wheel reaches the maximum value. A reference angle "a4" may be a target rotation angle of the host vehicle. The time point "t1" may be a braking start time point of the driven wheel or a braking start time point of all of the wheels 10*a*, 10*b*, 10*c*, and 10*d*. The time point "t2" may be a driving end time point of the driven wheel. In more detail, the driving end time point of the wheel may be a time point at which driving torque is not applied to the motor providing driving force. "t3" may be a time point at which braking force applied to the wheel reaches the maximum value. "t4" may be a time point at which the host vehicle reaches a position corresponding to the target rotation angle. When the host vehicle is rotated, the host vehicle is not capable of immediately stopping at a position corresponding to the target rotation angle due to inertia. Therefore, it is necessary to calculate a time point at which to stop application of driving torque to the wheels 10*a*, 10*b*, 10*c*, and 10*d* of the host vehicle and a time point at which to apply braking torque to the wheels so that the host vehicle stops at a position corresponding to the calculated rotation angle. The driving system and the brake system of the host vehicle, which generate driving torque and braking torque, may have different response speeds due to the characteristics thereof. For example, when the driving system is a motor and the brake system is a hydraulic brake device, the motor may have a relatively high response speed, and the hydraulic brake device may have a relatively low response speed. Therefore, the time point at which to stop application of driving torque is determined based on the responsiveness of the driving system, and the time point at which to increase the braking torque is determined based on the responsiveness of the brake system.

The autonomous driving controller 100 may predict the time point t3 taking into consideration the occurrence of additional rotation due to rotational inertia. The specifications of the host vehicle and the rotation speed of the host vehicle may be predetermined values, and the time taken for braking torque to reach the maximum value after commencement of braking due to the response characteristics of the brake system may be determined in advance. Accordingly, the time point t4 at which the host vehicle reaches a position corresponding to the target rotation angle may be determined, and the time point t3 may be predicted based on the time point t4. Even when the maximum braking torque is applied to the wheel, it takes time for the braking torque by the wheel to reach the maximum value. Therefore, the autonomous driving controller 100 may calculate the braking start time point t1 of the driven wheel based on the time point t3. In addition, even when driving torque is not applied to the wheel, it may take time for driving of the wheel to stop. Therefore, the autonomous driving controller 100 may calculate, based on the time point t3, the time point t2 at which application of the driving torque to the wheel is stopped (S960).

The motor controller 140 may commence braking of all of the wheels 10a, 10b, 10c, and 10d at the time point t1, and the brake controller 130 may terminate driving of the driven wheels at the time point t2 (S970).

The driving torque of the driven wheel may be gradually reduced from the time point t2 to the time point t3, and may become zero at the time point t3. The braking torque by the driven wheel may reach the maximum value at the time point t3. During the time period x between the time point t3 and the time point t4, the driving torque of the wheels 10a, 10b, 10c, and 10d is zero, but additional rotation may occur due to rotational inertia. The host vehicle may reach a position corresponding to the target angle through additional rotation due to rotational inertia. At this time, the brake controller 130 may stop application of the braking torque to the wheels 10a, 10b, 10c, and 10d. If the maximum braking torque is applied to the wheels 10a, 10b, 10c, and 10d of the host vehicle at the time of collision between the host vehicle and another vehicle, a greater degree of damage may be caused to the host vehicle. Therefore, when the rotation angle of the host vehicle reaches the target angle, the brake controller 130 may terminate braking of the wheels 10a, 10b, 10c, and 10d (S980).

When the occurrence of collision between the host vehicle and another vehicle is confirmed, the brake controller 130 may brake the wheels 10a, 10b, 10c, and 10d to the maximum extent, thereby preventing secondary damage due to a change in the position of the host vehicle due to the collision. When the movement of the host vehicle stops after the occurrence of collision, the autonomous driving controller 100 may notify the driver of the occurrence of collision (S990).

As is apparent from the above description, according to the embodiment of the present disclosure, a host vehicle in a turned-off state may determine the possibility of collision with another vehicle by itself based on a collision index, and may determine whether to perform rotation control thereof by itself, thereby minimizing damage thereto caused by collision with another vehicle when the host vehicle is in a parked state.

According to the embodiment of the present disclosure, the host vehicle is rotated based on the robustness index indicating the degree of damage thereto, thereby minimizing damage thereto caused by an unavoidable collision with another vehicle.

The present disclosure has been described above with reference to an exemplary embodiment. The embodiment described in the specification and shown in the accompanying drawings is illustrative only and is not intended to represent all aspects of the disclosure. Therefore, the present disclosure is not limited to the embodiment presented herein, and it is to be understood by those skilled in the art that various modifications or changes can be made without departing from the technical spirit or scope of the disclosure as disclosed in the appended claims.

What is claimed is:

1. A system for reducing damage from a vehicle collision, the system comprising:
   an autonomous driving controller configured to calculate a collision index indicating possibility of collision between a host vehicle and another vehicle approaching the host vehicle and to obtain data in a stopped state necessary to rotate the host vehicle then stop the host vehicle before the possible collision,
   wherein, when the collision index is equal to or greater than a threshold value, the autonomous driving controller calculates a rotation direction and a rotation angle of the host vehicle based on a robustness index indicating a degree of damage to the host vehicle depending on a heading angle of the other vehicle and a collision position of the host vehicle, and
   wherein the autonomous driving controller calculates the rotation direction and the rotation angle of the host vehicle so that collision with the other vehicle occurs at a collision position at which a value of the robustness index is maximized, and
   wherein the autonomous driving controller controls driving or braking of each wheel of the host vehicle based on the rotation direction and the rotation angle of the host vehicle.

2. The system of claim 1, wherein the autonomous driving controller continuously calculates the collision index while the other vehicle approaches the host vehicle,
   wherein, when the collision index is equal to or greater than a first threshold value, the autonomous driving controller supplies power to components configured to rotate the host vehicle,
   wherein, when the collision index is equal to or greater than the threshold value, the autonomous driving controller calculates the rotation direction and the rotation angle of the host vehicle, and
   wherein the threshold value is a second threshold value, and the second threshold value is greater than the first threshold value.

3. The system of claim 1, wherein the collision index is calculated based on at least one of a speed of the other vehicle, a distance between the host vehicle and the other vehicle, or an expected collision area, and
   wherein the expected collision area is an area in which a virtual shape indicating the host vehicle and a virtual shape indicating the other vehicle overlap each other based on a heading angle of the other vehicle with respect to a reference direction in which the host vehicle is oriented and based on a position of a center of the host vehicle.

4. The system of claim 1, wherein the collision index equal to or greater than the threshold value refers to a state in which it is impossible to avoid collision with the other vehicle in spite of control of the host vehicle.

5. The system of claim 1, wherein the robustness index is calculated based on a repair cost of the host vehicle varying depending on the collision position between the host vehicle and the other vehicle, and
   wherein the robustness index is determined based on a value obtained by dividing an expected repair cost at a specific collision position by a maximum repair cost selected from among expected repair costs at a plurality of collision positions.

6. The system of claim 1, wherein the robustness index varies depending on a speed of the other vehicle approaching the host vehicle.

7. The system of claim 1, wherein the collision position of the host vehicle is determined based on a relationship between a center of the host vehicle and the heading angle of the other vehicle.

8. The system of claim 1, wherein the autonomous driving controller determines a center of rotation of the host vehicle taking into consideration a center of the host vehicle, the heading angle of the other vehicle, the rotation direction, and the robustness index.

9. The system of claim 8, wherein the autonomous driving controller determines one wheel among the wheels of the host vehicle to be the center of rotation of the host vehicle in order to rotate the host vehicle in a direction away from the other vehicle, and wherein the determined wheel is a wheel required to be braked.

10. The system of claim 9, wherein the autonomous driving controller selects a wheel required to be braked and a wheel required to be driven from among the wheels taking into consideration the center of rotation, the rotation angle, and the rotation direction.

11. The system of claim 10, wherein a wheel disposed on the same side as the determined wheel, among left and right sides of the host vehicle based on a reference direction that is oriented from a rear to a front of the host vehicle, is a wheel not required to be braked or driven, and
wherein wheels disposed on a side opposite the determined wheel, among the left and right sides of the host vehicle, are wheels required to be driven.

12. The system of claim 8, wherein, when the center of rotation is the center of the host vehicle, all of the wheels are wheels required to be driven.

13. The system of claim 8, wherein the autonomous driving controller calculates a steering direction of the host vehicle based on the rotation direction, the rotation angle, and the center of rotation, and
wherein the system further comprises a steering controller configured to control a steering angle of the host vehicle based on information about the steering direction calculated by the autonomous driving controller.

14. The system of claim 10, further comprising a motor controller configured to control driving of a motor mounted to the wheel required to be driven and a brake controller configured to perform braking of the wheel required to be braked based on the rotation direction, the rotation angle, and the center of rotation calculated by the autonomous driving controller.

15. A method of reducing damage from a vehicle collision, the method comprising:
detecting, by sensors, movement of another vehicle approaching a stopped host vehicle;
calculating, by a controller, a collision index indicating possibility of collision between the host vehicle and the other vehicle;
determining, by the controller, whether to supply power to components configured to rotate the host vehicle by determining whether the collision index is equal to or greater than a first threshold value; and
calculating, by the controller, a rotation direction and a rotation angle of the host vehicle based on a robustness index indicating a degree of damage to the host vehicle depending on a heading angle of the other vehicle and a collision position of the host vehicle by determining whether the collision index is equal to or greater than a second threshold value,
wherein the host vehicle comes to a stop state before the possible collision.

16. The method of claim 15, wherein the controller determines the robustness index varying based on a speed of the other vehicle approaching the host vehicle.

17. The method of claim 15, wherein the calculating a rotation direction and a rotation angle of the host vehicle comprises determining a center of rotation of the host vehicle taking into consideration a center of the host vehicle, the heading angle of the other vehicle, the rotation direction, and the robustness index.

18. The method of claim 17, comprising controlling, by the controller, wheels of the host vehicle in order to rotate the host vehicle in the rotation direction and to the rotation angle about the determined center of rotation,
wherein stoppage, driving, or braking of each of the wheels is determined depending on the rotation direction and the center of rotation.

19. The method of claim 18, wherein, when the center of rotation is determined to be the center of the host vehicle, all of the wheels are driven by the controller, and wherein, when the center of rotation is determined to be one wheel among the wheels, a wheel disposed on the same side as the determined wheel, among left and right sides of the host vehicle, is kept stationary by the controller, and wheels disposed on a side opposite the determined wheel, among the left and right sides of the host vehicle, are driven by the controller.

20. The method of claim 19, wherein the controller stops the driven wheels in advance before the host vehicle reaches a position corresponding to calculated target angle taking into consideration occurrence of additional rotation of the host vehicle due to inertia when the driven wheels are braked.

* * * * *